United States Patent
El-Wardany et al.

(10) Patent No.: US 9,835,216 B2
(45) Date of Patent: Dec. 5, 2017

(54) FRICTION BRAKE ASSEMBLY WITH AN ABRADABLE METAL FOAM BRAKE PAD

(75) Inventors: Tahany Ibrahim El-Wardany, Bloomfield, CT (US); Aaron T. Nardi, East Granby, CT (US); Xiaodong Luo, South Windsor, CT (US); Paul Sheedy, Vernon, CT (US); James T. Beals, West Hartford, CT (US); Robert A. Barth, South Windsor, CT (US); Wayde R. Schmidt, Pomfret Center, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 14/423,354

(22) PCT Filed: Aug. 29, 2012

(86) PCT No.: PCT/US2012/052734
§ 371 (c)(1),
(2), (4) Date: Feb. 23, 2015

(87) PCT Pub. No.: WO2014/035382
PCT Pub. Date: Mar. 6, 2014

(65) Prior Publication Data
US 2015/0292582 A1    Oct. 15, 2015

(51) Int. Cl.
*F16D 69/02*    (2006.01)
*B66B 5/22*    (2006.01)
(Continued)

(52) U.S. Cl.
CPC .............. *F16D 69/027* (2013.01); *B05D 1/12* (2013.01); *B05D 3/007* (2013.01); *B66B 5/22* (2013.01);
(Continued)

(58) Field of Classification Search
CPC ........ F16D 69/00; F16D 69/02; F16D 69/027; F16D 2200/00; F16D 69/0004;
(Continued)

(56) References Cited

U.S. PATENT DOCUMENTS 5,433,774 A * 7/1995 Kapl ..................... F16D 69/028
106/36
5,964,320 A    10/1999 Kato et al.
(Continued)

FOREIGN PATENT DOCUMENTS

| JP | 00824581 | 9/1996 |
| JP | 08245810 | 9/1996 |

(Continued)

OTHER PUBLICATIONS

English machine translation of JP 2008-063519 (Fujikawa).*
(Continued)

*Primary Examiner* — Vishal Sahni
(74) *Attorney, Agent, or Firm* — O'Shea Getz P.C.

(57) ABSTRACT

A brake assembly and a method for manufacturing a brake assembly are provided. The brake assembly includes a brake pad affixed to a substrate. The brake pad extends from the substrate to a brake pad friction surface, and includes abradable cellular metal foam with the hardened ceramic particles.

23 Claims, 4 Drawing Sheets

(51) Int. Cl.
*B05D 1/12* (2006.01)
*B05D 3/00* (2006.01)
*F16D 69/04* (2006.01)

(52) U.S. Cl.
CPC .... *F16D 69/0408* (2013.01); *F16D 2069/045* (2013.01)

(58) Field of Classification Search
CPC ....... F16D 2069/0408; F16D 2069/045; F16D 2069/0466; F16D 2069/0475; F16D 69/0408; F16D 2200/0004; B05D 1/12; B05D 3/007; B66B 5/22
USPC .............................. 188/250 R, 251 A, 250 G
See application file for complete search history.

(56) References Cited

U.S. PATENT DOCUMENTS

| | | | |
|---|---|---|---|
| 5,964,322 A | 10/1999 | Thompson et al. | |
| 6,298,764 B1* | 10/2001 | Sherman | F41A 21/34 89/14.2 |
| 6,371,261 B1 | 4/2002 | Thompson et al. | |
| 6,668,985 B2 | 12/2003 | Krenkel et al. | |
| 6,843,876 B1 | 1/2005 | Kent | |
| 7,168,534 B2* | 1/2007 | Loszewski | C04B 35/521 188/250 R |
| 7,575,099 B2 | 8/2009 | Oh et al. | |
| 8,075,827 B2 | 12/2011 | Loukus et al. | |
| 2003/0127775 A1 | 7/2003 | McDonald | |
| 2005/0183909 A1* | 8/2005 | Rau, III | F16D 65/0006 188/218 XL |
| 2005/0127950 A1 | 10/2005 | Jolly, Jr. et al. | |
| 2009/0035598 A1* | 2/2009 | Hanna | B22D 19/00 428/550 |
| 2010/0133046 A1 | 6/2010 | Allwardt et al. | |
| 2010/0304171 A1* | 12/2010 | Tomantschger | C08J 7/123 428/548 |
| 2010/0331173 A1* | 12/2010 | Ebener | B01J 35/04 502/300 |
| 2011/0064876 A1 | 3/2011 | Grader et al. | |
| 2011/0308895 A1 | 12/2011 | Shen et al. | |
| 2012/0237789 A1* | 9/2012 | Wang | C25D 5/54 428/626 |

FOREIGN PATENT DOCUMENTS

| | | |
|---|---|---|
| JP | 2008-063519 A * | 3/2008 |
| JP | 2008063519 | 3/2008 |
| WO | 2010069963 | 6/2010 |
| WO | WO2010/069953 A1 * | 6/2010 |

OTHER PUBLICATIONS

"New Technology Revolution Dictionary", Technical Development Sector of Machinery Science Academy, China Machine Press, pp. 219-221, Apr. 30, 1985.
CN office action for CN201280075444.0 dated Oct. 27, 2016.
Office action for CN201280075444.0 dated Apr. 19, 2017.

* cited by examiner

FRICTION BRAKE ASSEMBLY WITH AN ABRADABLE METAL FOAM BRAKE PAD

This application is entitled to the benefit of, and incorporates by reference essential subject matter disclosed in PCT Application No. PCT/US2012/052734 filed on Aug. 29, 2012.

BACKGROUND OF THE INVENTION

1. Technical Field

This disclosure relates generally to a friction brake system and, more particularly, to a brake pad for a friction brake assembly.

2. Background Information

A typical linear brake system for an elevator includes a plurality of brake actuation systems and a plurality of elevator brake assemblies. The brake actuation systems are attached to an elevator car that moves vertically within a hoistway along at least one elevator car guiderail. Each elevator brake assembly may include a solid metal brake pad affixed to a metal wedge-shaped brake shoe. Friction surfaces of the brake pads may engage respective opposing friction surfaces of the guiderail to slow or stop the relative vertical movement between the elevator car and the guiderail during emergency and/or overspeed situations. The term "overspeed" is used herein to describe a situation where the speed of the relative vertical movement is greater than, for example, 125% of an elevator's rated speed.

The engagement between the friction surfaces may subject the brake pads and the guiderail to relatively high temperatures. These high temperatures may cause the brake pads to fuse with (e.g., weld to) the guiderail, which may significantly increase the cost and time required to reset the linear brake system after each use. The high temperatures, as well as brake pad wear, may also decrease the coefficient of friction of such solid metal brake pads, which may significantly increase elevator car braking distances.

SUMMARY OF THE DISCLOSURE

According to an aspect of the invention, a brake assembly is provided that includes a brake pad affixed to a substrate such as, for example, a brake shoe or carrier plate. The brake pad extends from the substrate to form a brake pad friction surface, and includes abradable cellular metal foam.

According to another aspect of the invention, a method is provided for manufacturing a brake assembly. The method includes coating (e.g., cold spraying) a substrate such as, for example, a brake shoe or carrier plate with brake pad material. The brake pad material may include metal and a foaming agent. The coated substrate is heated to a temperature that activates the foaming agent, and transforms the brake pad material into abradable cellular metal foam. The metal foam-coated substrate is subsequently cooled, for example, to ambient.

Alternatively, or in addition to this or other aspects of the invention, the brake pad material may also include one or more of metal or ceramic powders or particles. The brake pad material may include, for example, (i) one or more metal powders such as nickel chrome and/or nickel aluminum, and (ii) one or more hardened ceramic particles such as chromium carbide, cobalt carbide, silicon carbide, and/or tungsten carbide. The metal powders may alloy together, and bond with the ceramic particles during heating.

Alternatively, or in addition to this or other aspects of the invention, the metal foam may be open-cell metal foam or closed-cell metal foam. The metal foam may be configured with substantially uniform pore geometries and/or pore sizes. Alternatively, the metal foam may be configured with non-uniform pore geometries and/or pore sizes.

Alternatively, or in addition to this or other aspects of the invention, the metal foam may be configured with an engineered lattice (e.g., scaffold) structure.

Alternatively, or in addition to this or other aspects of the invention, the metal foam may have a metal foam pore-to-metal foam material volumetric porosity of greater than about one to nineteen (1:19). The volumetric porosity, for example, may be between about three to about seventeen (3:17) or, in other embodiments of the invention, about three to about seven (3:7).

Alternatively, or in addition to this or other aspects of the invention, the metal foam may have a metal foam pore size that is less than and/or equal to about one hundred and fifty microns.

Alternatively, or in addition to this or other aspects of the invention, the friction surface may have a coefficient of friction greater than about 0.35.

Alternatively, or in addition to this or other aspects of the invention, the metal foam may be operable to withstand a temperature greater than about 800 to 1250 degrees Centigrade (° C.), and a compressive contact stress greater than about forty to eighty mega Pascal (MPa).

Alternatively, or in addition to this or other aspects of the invention, the metal foam may include tungsten, iron, chromium, cobalt, nickel, titanium, silicon, molybdenum, carbon, boron and/or aluminum.

Alternatively, or in addition to this or other aspects of the invention, the substrate may include steel or iron (e.g., cast iron).

Alternatively, or in addition to this or other aspects of the invention, a bond layer may be disposed between the substrate and the brake pad.

Alternatively, or in addition to this or other aspects of the invention, the substrate may be configured as a wedge-shaped brake shoe for an elevator safety brake system.

Alternatively, or in addition to this or other aspects of the invention, the substrate may be configured as a carrier plate and removably connected to a wedge-shaped brake shoe for an elevator safety brake system.

The foregoing features and the operation of the invention will become more apparent in light of the following description and the accompanying drawings.

DETAILED DESCRIPTION OF THE INVENTION

Figure 1:
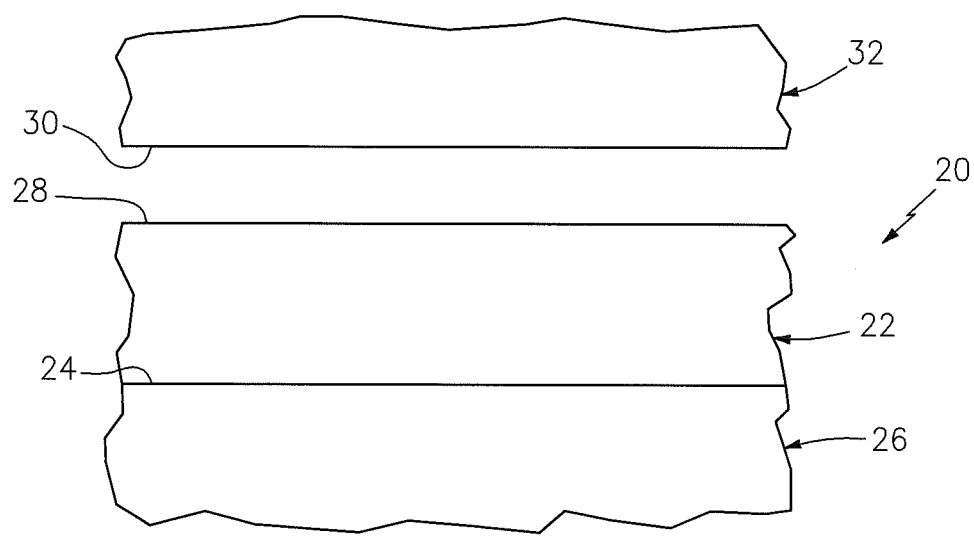
FIG. 1 is a sectional illustration of a friction brake assembly.

FIG. 1 illustrates a section of a friction brake assembly 20. The brake assembly 20 includes a brake pad 22 affixed (e.g., mechanically connected and/or chemically bonded) to an outer surface 24 of a first (e.g., steel or cast iron) substrate 26. The brake pad 22 extends away from the first substrate 26 to a brake pad friction surface 28, which may be substantially parallel to the outer surface 24 of the first substrate 26. The brake pad friction surface 28 is adapted to engage (e.g., contact) a friction surface 30 of a second (e.g., steel) substrate 32 in order to slow or stop relative movement between the first substrate 26 and the second substrate 32.

Figure 2:
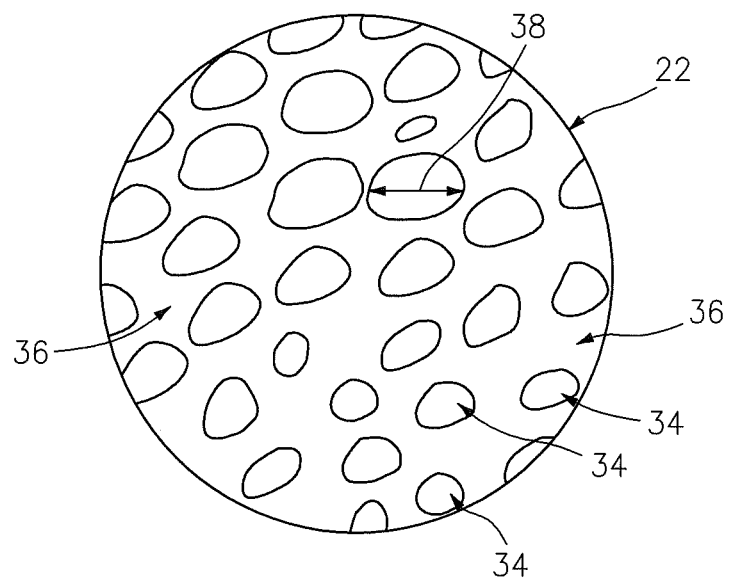
FIG. 2 is an enlarged illustration of a cellular metal foam brake pad included in the friction brake assembly of FIG. 1.

Referring to FIG. 2, the brake pad 22 is constructed from abradable cellular metal foam. The metal foam includes a plurality of metal foam pores 34 (also sometimes referred to as "interstices") that are substantially homogeneously disposed within metal foam material 36. Alternatively, the metal foam pores may be substantially heterogeneously disposed within the metal foam material 36. The metal foam has a metal foam pore-to-metal foam material volumetric porosity greater than, for example, about one to nineteen (1:19). According to various further aspects of the invention, the metal foam may have a metal foam pore-to-metal foam material volumetric porosity between, for example, about three to about seventeen (3:17) and about three to about seven (3:7), which may reduce the tendency of the friction surfaces 28 and 30 to weld or fuse together during braking.

Figure 3:
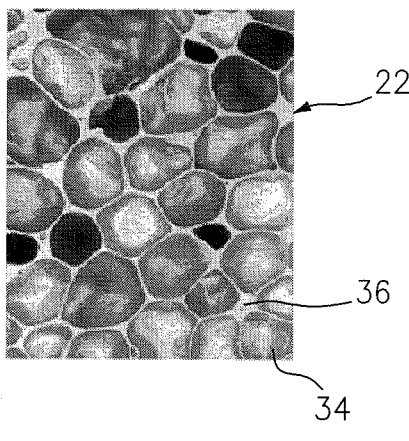
FIG. 3 is a photographic illustration of a closed-cell metal foam brake pad.
Figure 4:
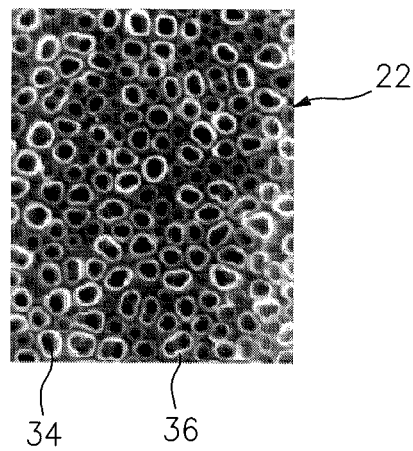
FIG. 4 is a photographic illustration of another closed-cell metal foam brake pad.
Figure 5:
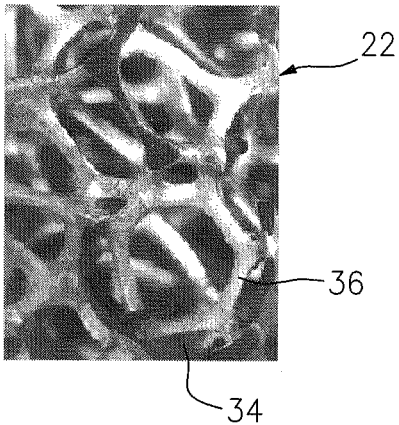
FIG. 5 is a photographic illustration of an open-cell metal foam brake pad.
Figure 6:
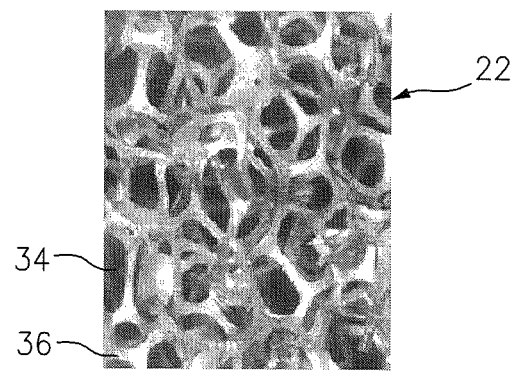
FIG. 6 is a photographic illustration of another open-cell metal foam brake pad.
Figure 7:
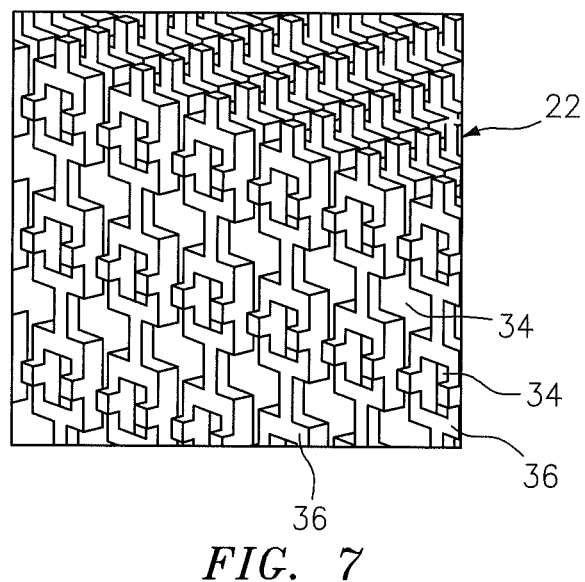
FIG. 7 is a diagrammatic illustration of still another open-cell metal foam brake pad.

The metal foam pores 34 may generally be discrete (e.g., sealed) from one another where the metal foam is closed-cell metal foam as illustrated in FIGS. 2, 3, and 4. Alternatively, the metal foam pores 34 may generally be interconnected where the metal foam is open-celled metal foam as illustrated in FIGS. 5, 6, and 7. The metal foam, for example, may have an open-celled reticulated structure as shown in FIGS. 5 and 6. Alternatively, the metal foam may have an open-celled engineered lattice (e.g., scaffold) structure as illustrated in FIG. 7. Additional details regarding such an engineered lattice structure are disclosed in U.S. Pat. No. 7,871,578, which is hereby incorporated herein by reference in its entirety.

The metal foam pores 34 may have substantially uniform pore geometries and/or pore sizes as illustrated in FIGS. 4 and 7. Alternatively, the metal foam pores 34 may have non-uniform pore geometries and/or pore sizes as illustrated in FIGS. 2 and 3. Referring to FIG. 2, some or substantially all of the metal foam pores 34 have a pore size 38 (e.g., an average or maximum diameter) that is less than or equal to, for example, about one hundred and fifty microns; e.g., between about five to one hundred microns. A pore size 38 of less than 150 microns may ensure that the brake pad 22 stiffness is within the preferred range.

Referring to FIGS. 1 and 2, the metal foam material 36 includes one or more foam material components selected to provide the brake pad 22 with certain material properties. The foam material components may be selected, for example, to provide the brake pad friction surface 28 with a coefficient of friction that is greater than, for example, about 0.3. According to a further aspect of the invention, the foam material components may be selected, for example, to provide the brake pad friction surface 28 with a coefficient of friction between about 0.35 and about 0.5. The foam material components may be selected such that the metal foam is operable to withstand temperatures greater than about 800 degrees Centigrade. According to a further aspect of the invention, the foam material components may be selected such that the metal foam is operable to withstand temperatures between about 800 and about 1250 degrees Centigrade. The foam material components may also or alternatively be selected such that the metal foam is operable to withstand compressive loads (e.g., contact stresses) greater than about forty mega Pascal (MPa). According to further aspect of the invention, the foam material components may be selected such that the metal foam is operable to withstand compressive loads between about fifty and about eighty MPa.

Examples of suitable foam material components include, but are not limited to, tungsten, iron, chromium, cobalt, nickel, titanium, silicon, molybdenum, carbon, boron and/or aluminum. The foam material components may also include, for example, decomposed foaming agent where the metal foam is closed-cell metal foam.

Figure 8:
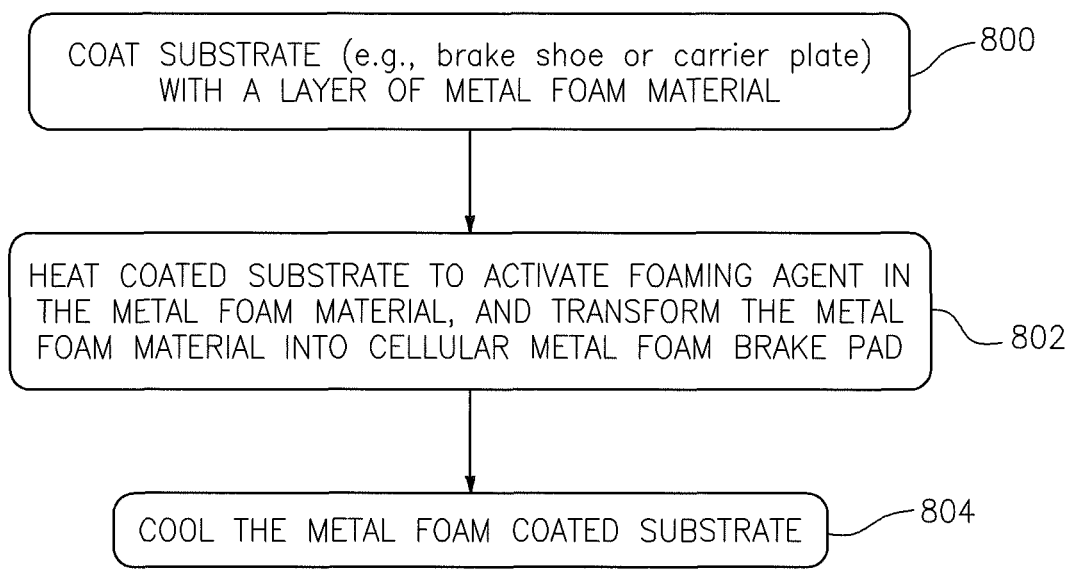
FIG. 8 is a flow diagram of a method for manufacturing the brake assembly of FIGS. 1 and 2.

FIG. 8 is a flow diagram of a method for manufacturing the brake assembly 20 illustrated in FIGS. 1 and 2. In step 800, the first substrate 26 is coated with a layer of the metal foam material 36, which is typically substantially devoid of the pores 34. The first substrate 26 may be sprayed (e.g., cold sprayed) with, for example, a mixture of (i) metal powder, (ii) a plurality of hardened particles, and (iii) foaming agent. Examples of the metal powders include, but are not limited to, nickel, iron, titanium, cobalt, boron, and chromium, etc. Examples of the hardened particles include, but are not limited to, chromium carbide, cobalt carbide, tungsten carbide, silicon carbide, etc. Examples of the foaming agent may include, but are not limited to, self-flux metal powder such as nickel chrome boron silicon (NiCrSiB) alloys, nickel boron silicon, etc., low melt metals and/or alloys such as aluminum and silicon, polymers such as polyester and/or poly(methyl methacrylate), metal hydrides such as titanium hydride (TiH$_2$), etc. The present invention, however, is not limited to any particular types and/or combinations of metal foam materials.

In step 802, the coated substrate is heated to a temperature (e.g., above 1250 degrees Centigrade) that activates (e.g., decomposes or melts) the foaming agent, and transforms the metal foam material 36 into the metal foam brake pad 22 of FIGS. 1 and 2. The coated substrate, for example, is heated to a temperature at which the foaming agent decomposes from a solid or liquid into a gas (or melts and/or reacts leaving a void), thereby forming the metal foam pores 34. The heat at this temperature alloys the self-flux metal powder together, thereby forming a matrix which bonds the hardened ceramic particles together and to the outer surface 24 of the first substrate 26.

In step 804, the metal foam coated substrate is cooled, for example, to ambient. The metal foam coated substrate, for example, may be cooled at a specific rate in a gas environment to a temperature above ambient. The coated substrate may subsequently be cooled to ambient in an ambient environment.

In some embodiments, a bond layer may be applied to the outer surface 24 of the first substrate 26 prior to the coating of the metal foam material 36 to enhance bonding between the first substrate 26 and the brake pad 22. Examples of suitable bond layer materials include, but are not limited to, nickel or iron base alloys, etc.

In alternate embodiments, the brake pad 22 may be pre-formed using, for example, a casting or powder metallurgical process, and/or an additive manufacturing method such as laser sintering, and subsequently affixed to the outer surface 24 of the first substrate 26. The pre-formed brake pad, for example, may be sintered or hot pressed onto the outer surface 24 of the first substrate 26.

Figure 9:
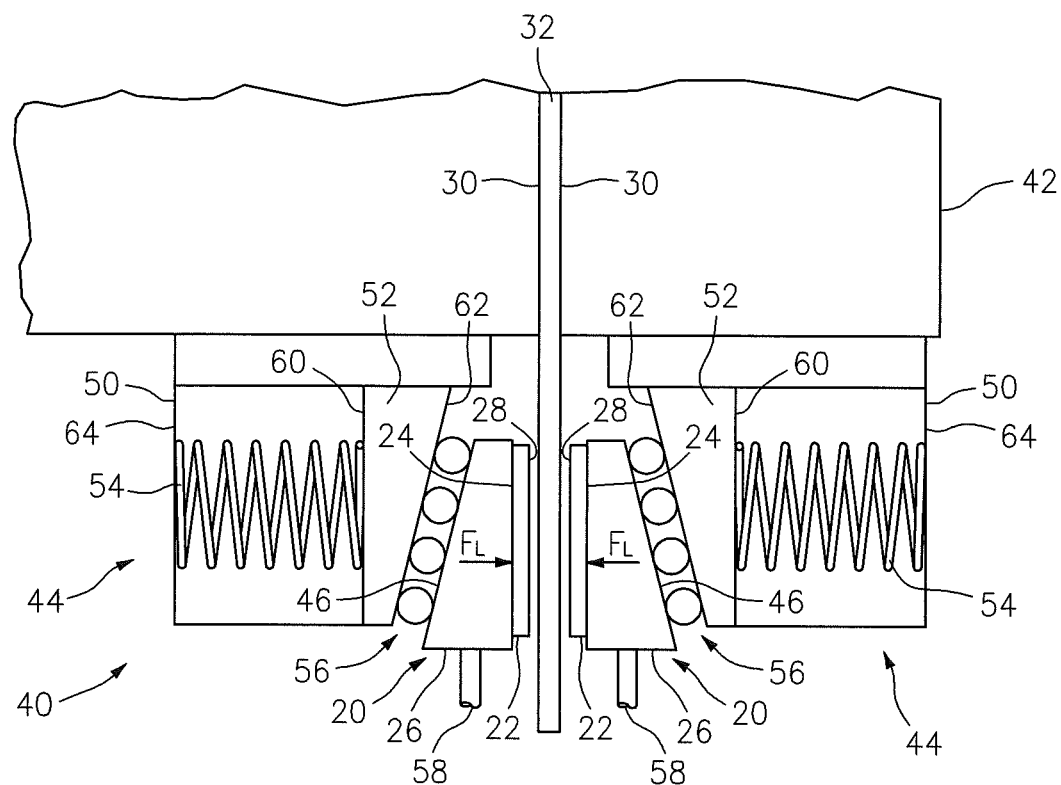
FIG. 9 is a side illustration of a linear braking system for an elevator.

A person of skill in the art will recognize the aforedescribed brake assembly 20 may be implemented in various types of friction braking systems. One or more of the brake assemblies 20 of FIGS. 1 and 2, for example, may be configured in a linear braking system, a disk braking system, a drum braking system, etc. An example of a linear brake system 40 for an elevator having an elevator car 42 that moves vertically along at least one elevator car guiderail (e.g., the second substrate 32) is illustrated in FIG. 9. Such a linear braking system 40 includes one or more elevator brake actuation systems 44 that respectively actuate one or more of the brake assemblies 20 (e.g., elevator brake assemblies).

Figure 10:
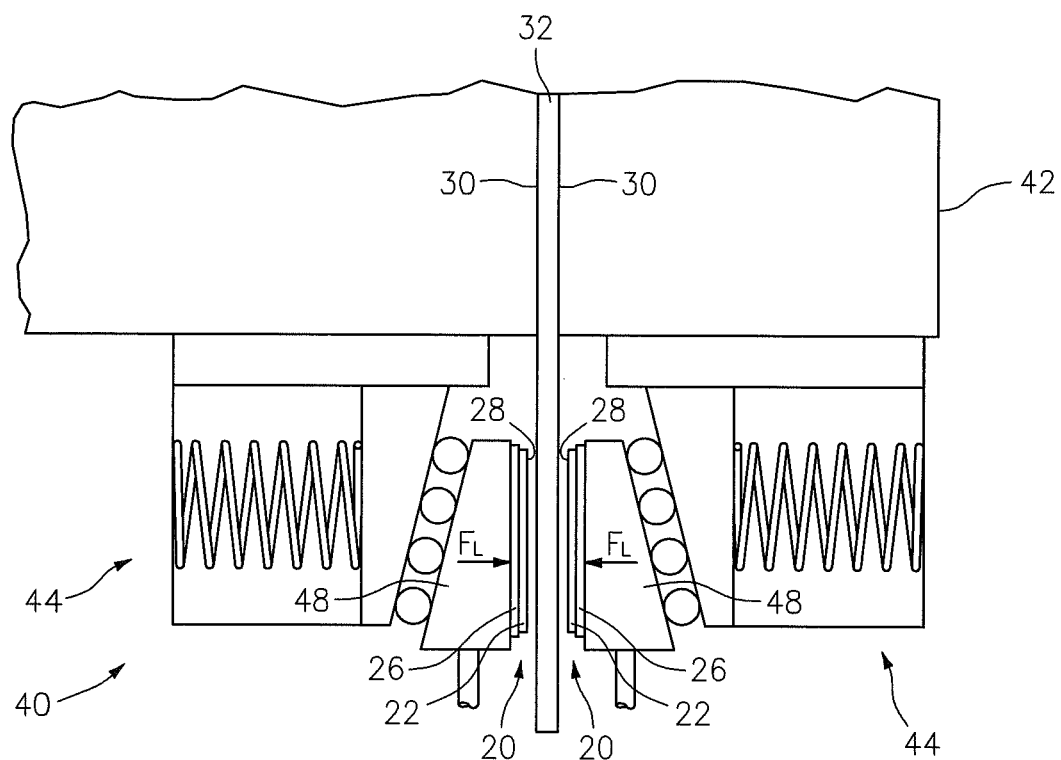
FIG. 10 is a side illustration of another linear braking system for an elevator.

In the specific embodiment of FIG. 9, the first substrate 26 of each brake assembly 20 is configured as a wedge-shaped brake shoe, and extends laterally between an inclined cam surface 46 and the outer surface 24 to which the brake pad 22 is attached. Alternatively, for example as illustrated in FIG. 10, the first substrate 26 of each brake assembly 20 may be configured as a brake pad carrier plate that is removably attached to a respective wedge-shaped brake shoe 48. Referring again to the specific embodiment of FIG. 9, the brake pad friction surface 28 is located adjacent a respective friction surface 30 of the guiderail 32.

Each of the brake actuation systems 44 includes an actuator housing 50, a wedge shaped guide shoe 52, a spring 54, a roller cage assembly 56 and an actuator 58. The actuator housing 50 is attached to the elevator car 42. The guide shoe 52 extends laterally between a spring surface 60 and an inclined cam surface 62, and is slidably arranged within the actuator housing 50. The spring 54 extends laterally between a housing endwall 64 and the spring surface 60, and biases the guide shoe 52 towards the respective first substrate 26. The roller cage assembly 56 includes a plurality of rollers that are arranged between the inclined cam surfaces 46 and 62. The actuator 58 is connected to the respective first substrate 26. Examples of such an actuator 58 include, but are not limited to, a rope, a cable, a mechanical linkage, and a loaded spring system.

The linear braking system 40 may be operated during, for example, emergency and/or overspeed conditions to slow or stop relative vertical movement between the elevator car 42 and the guiderail 32. The actuators 58, for example, may move the first substrates 26 vertically relative to the guide shoes 52. As the first substrates 26 move vertically, the springs 54 apply opposing lateral forces $F_L$ to the first substrates 26 through the roller cage assembly 56. The application of the forces $F_L$ causes the first substrates 26 to move laterally towards the guiderail 32 until the brake pad friction surfaces 28 engage (e.g., contact) the guiderail friction surfaces 30. This engagement between the friction surfaces 28 and 30 is operable to slow or stop relative vertical movement between the elevator car 42 and the guiderail 32.

The engagement between the friction surfaces 28 and 30 may subject the first substrates 26 and the guiderail 32 to relatively high temperatures. As described above, such high temperatures can cause a prior art brake pad to fuse (e.g., weld) to the guiderail. The brake pad 22 of FIGS. 1 and 2, in contrast, is operable to abrade during the engagement to reduce or prevent such fusing between the friction surfaces 28 and 30. The engagement between the friction surfaces 28 and 30, for example, may break the bonds between the alloyed metal powder and the hardened ceramic particles. As these bonds break, the friction surface 28 is worn away exposing previously unexposed brake pad material such as, for example, previously unexposed hardened ceramic (e.g., carbide) particles. These ceramic particles may have relatively sharp edges, which can efficiently cut the friction surface 30. The metal foam pores 34 may accommodate (e.g., receive) at least some of the worn brake pad material, which may reduce material build up between the friction surfaces 28 and 30. In this manner, the brake pad abrasion and the metal foam pores 34 can reduce the relatively high temperatures to which the friction surfaces 28 are subject. In addition to the foregoing, the metal foam material 36 may maintain a relatively high coefficient of friction (e.g., greater than 0.35) at the brake pad friction surface 28 throughout the engagement between the friction surfaces 28 and 30.

A person of skill in the art will recognize the brake pads 22 may be sized for a single use, or for multiple uses. The brake pads 22 for the linear braking system 40, for example, may be sized to withstand X number of uses where, for example, X is equal to Y number of elevator car test drops and Z number of emergency and/or overspeed operational uses.

A person of skill in the art will also recognize that the components and/or porosity of the metal foam material 36 may be configured to meet specific brake system design standards. The brake pads 22 for the linear braking system 40 may be configured, for example, to stop the elevator car 42 in under two to ten meters of vertical travel, depending on the rated and braking speed applications, and to have less than twenty microns of abrasion for an elevator car test drop at eleven and one half meters per second.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A brake assembly, comprising:
    a substrate; and
    a brake pad comprising abradable cellular metal foam, wherein the brake pad is affixed to the substrate, and extends away from the substrate to form a brake pad friction surface, and wherein the metal foam consists essentially of at least one carbide and at least one metal alloy; and
    wherein the metal alloy comprises at least one of cobalt, titanium or boron; and
    wherein the metal alloy forms a metal alloy matrix which bonds particles of the carbide together.

2. The brake assembly of claim 1, wherein the metal foam comprises open-cell metal foam.

3. The brake assembly of claim 1, wherein the metal foam comprises closed-cell metal foam.

4. The brake assembly of claim 1, wherein the metal foam comprises a lattice structure.

5. The brake assembly of claim 1, wherein the metal foam has a metal foam pore to metal foam material volumetric porosity of greater than about one to nineteen.

6. The brake assembly of claim 5, wherein the volumetric porosity is between about three to seventeen and about three to about seven.

7. The brake assembly of claim 1, wherein the metal foam has a metal foam pore size that is one of less than and equal to about one hundred fifty microns.

8. The brake assembly of claim 1, wherein the friction surface has a coefficient of friction greater than about 0.3.

9. The brake assembly of claim 1, wherein the metal foam is operable to withstand a temperature greater than about eight hundred degrees Centigrade, and a compressive load greater than forty mega Pascals.

10. The brake assembly of claim 1, wherein the metal alloy comprises at least the cobalt.

11. The brake assembly of claim 1, wherein the substrate includes one of steel and iron.

12. The brake assembly of claim 1, further comprising a bond layer disposed between the substrate and the brake pad.

13. The brake assembly of claim 1, wherein the substrate comprises a wedge-shaped brake shoe for an elevator safety brake system.

14. The brake assembly of claim 1, wherein the substrate is removably connected to a wedge-shaped brake shoe for an elevator safety brake system.

15. The brake assembly of claim 1, wherein the metal alloy comprises at least the titanium.

16. The brake assembly of claim 1, wherein the metal alloy comprises at least the boron.

17. A method for manufacturing a brake assembly, comprising:
    coating a substrate with brake pad material comprising a metal powder, a plurality of carbide particles and a foaming agent that is a heat activated foaming agent;
    heating the coated substrate to a temperature that activates the foaming agent and transforms the brake pad material into abradable cellular metal foam; and
    cooling the abradable cellular metal foam coated substrate;
    wherein, during the heating of the coated substrate, the metal powder alloys together and bonds with the carbide particles;
    wherein the metal comprises at least one of cobalt, titanium or boron; and
    wherein the abradable cellular metal foam consists essentially of the alloyed metal powder and the bonded carbide particles.

18. The method of claim 17, wherein the coating comprises cold spraying the brake pad material onto the substrate.

19. The method of claim 17, wherein
    the brake pad material further comprises a binder; and
    the carbide particles comprise a plurality of hardened ceramic particles; and
    wherein, during the heating of the coated substrate, the metal powder alloys together and bonds with the hardened ceramic particles and the binder.

20. The method of claim 17, wherein the metal foam is operable to withstand a temperature greater than about eight hundred degrees Centigrade, and a compressive load greater than about forty mega Pascals.

21. The method of claim 17, wherein
    the metal foam has a metal foam pore-to-metal foam material volumetric porosity between about one to nineteen and about three to two; and
    the metal foam has a metal foam pore size that is one of less than and equal to about one hundred and fifty microns.

22. The method of claim 17, wherein the temperature is above 1250 degrees Centigrade.

23. The method of claim 17, wherein the alloyed metal powder forms a metal alloy matrix which bonds the carbide particles together.

* * * * *